United States Patent
Engst

[11] Patent Number: 6,110,863
[45] Date of Patent: Aug. 29, 2000

[54] ABSORPTION MAT, ESPECIALLY FOR ORGANIC HYDROCARBONS

[75] Inventor: Wilhelm Engst, Köln, Germany

[73] Assignee: Clouth Gummiwerke Aktiengesellschaft, Cologne, Germany

[21] Appl. No.: 08/170,177

[22] PCT Filed: May 23, 1993

[86] PCT No.: PCT/DE92/00419

§ 371 Date: Dec. 22, 1993

§ 102(e) Date: Dec. 22, 1993

[87] PCT Pub. No.: WO93/00162

PCT Pub. Date: Jan. 7, 1993

[30] Foreign Application Priority Data

Jun. 22, 1991 [DE] Germany ............... 41 20 701
Nov. 7, 1991 [DE] Germany ............... 41 36 647

[51] Int. Cl.[7] ............ B01J 20/26; B01J 20/22; B65D 1/34; F16N 31/00
[52] U.S. Cl. ............ 502/402; 502/401; 210/680; 210/693; 210/924; 220/573
[58] Field of Search ............ 502/401, 402; 210/680, 693, 924; 220/573

[56] References Cited

U.S. PATENT DOCUMENTS

| | | | |
|---|---|---|---|
| 3,591,494 | 7/1971 | Crouch et al. | 210/680 |
| 4,481,335 | 11/1984 | Stark, Jr. | 525/261 |
| 4,484,661 | 11/1984 | Evenson | 220/573 |
| 4,497,147 | 2/1985 | Clapper et al. | 52/105 |
| 4,684,562 | 8/1987 | Hartkemeyer | 428/182 |
| 4,801,005 | 1/1989 | Hahn et al. | 141/98 |
| 4,826,030 | 5/1989 | Valley | 220/573 |
| 4,923,052 | 5/1990 | Englebert | 220/573 |
| 5,011,007 | 4/1991 | Kenimer | 206/205 |
| 5,020,638 | 6/1991 | Smith | 220/573 |
| 5,270,089 | 12/1993 | Alston et al. | 428/60 |

FOREIGN PATENT DOCUMENTS

| | | |
|---|---|---|
| 0348491 | 2/1979 | Austria . |
| 3122219 | 3/1982 | Germany . |
| 3608952 | 4/1987 | Germany . |
| 50-050279 | 5/1975 | Japan . |

OTHER PUBLICATIONS

Kirk–Othmer Encyclopedia of Chemical Technology, Third Edition, vol. 16, pp. 433–434 and vol. 20, pp. 367–369, 432–433, 1982.

Primary Examiner—Walter D. Griffin
Attorney, Agent, or Firm—Walter Ottesen

[57] ABSTRACT

An absorption mat 1 is described which is suitable for receiving organic hydrocarbons in liquid, paste-like or solid form, for example, oil, fats, fuels and solvents. The absorption mat is characterized by a plate-like and/or block-like molded body 2 made of rubber granulate 3 or rubber shavings 3 brought into a bond with each other to define a shape with the mat being received in a trough 6 or the like open at one side thereof and made of a material or at least containing a layer 7 resistant to the hydrocarbons and seated in a trough 6 open at one end.

16 Claims, 2 Drawing Sheets

ABSORPTION MAT, ESPECIALLY FOR ORGANIC HYDROCARBONS

FIELD OF THE INVENTION

The invention relates to an absorption mat, which is especially suited for organic hydrocarbons in liquid, paste-like or solid form, for example, for oils, fats, fuels or solvents.

BACKGROUND OF THE INVENTION

It is known that liquid, paste-like or solid hydrocarbons have a higher affinity for specific materials than with respect to water. Accordingly, the hydrocarbons can be received or absorbed in bodies manufactured from these materials.

Previously, these characteristics have rather been viewed as a disadvantage because a swelling of the components manufactured from the particular materials resulted.

SUMMARY OF THE INVENTION

The invention is, however, directed toward using the known characteristics of these materials in an advantageous manner in order to take up, trap or separate liquid, paste-like or solid hydrocarbons in order to protect the environment.

Any place where it cannot be prevented that such hydrocarbons escape or are emitted because of a work process or treating process, it is of special importance that these hydrocarbons do not directly reach the environment in an unwanted manner and especially that the substances do not reach the ground or are diverted thereto.

For this reason, it is the subject matter of the invention to provide absorption mats which can be placed on floors, ramps and service aisles in the area of treatment facilities or processing facilities or the like.

According to the invention, these absorption mats are primarily characterized by at least one plate-like or block-like molded body made of oil and/or solvent absorbing material or oil and/or solvent receiving material on the basis of, for example, NR-rubber, IR-rubber, IIR-rubber or BR-rubber which is seated or accommodated in a trough or the like which is open at one end, namely, from above, with the trough being made of a material being an oil and/or solvent resistant or at least containing an oil and/or solvent resistant layer.

The plate-like or block-like molded body can be made of elastomers, which absorb or take up organic hydrocarbons, for example, NR-elastomers, RI-elastomers, IIR-elastomers, BR-elastomers, SBR-elastomers but also thermoplastic elastomers (TPE), thermoplasts or duroplasts.

In a porous, cellular or foamed form, these materials can be processed to the plate-like and/or block-like molded body for increasing the absorption capability. Preferably, the molded body comprises rubber granulate brought into a compound which maintains a form or rubber shavings.

The placement of absorption mats configured in this manner in the area of treatment and/or processing facilities affords the advantage that the organic hydrocarbons are reliably trapped when they drip and are retained against an unwanted removal into the environment. The organic hydrocarbons are removed by means of the treated or processed workpieces.

It has been proven advantageous according to the invention when the rubber granulate or the rubber shavings are bonded by oil and/or solvent resistant binding agents and/or by vulcanization to the plate-like and/or block-like body.

An especially great effectiveness of the absorption mat is then obtained in accordance with the invention when the rubber granulate or the rubber shavings of the molded body are porous, for example, when they comprise cellular rubber, microcellular rubber or foam rubber. It is understood that the molded body can, however, contain also granulate or shavings made of solid material.

The invention provides that the plate-like and/or block-like molded body is provided over most of its thickness with recesses, for example, grooves, rills, holes or a combination thereof so that the swelling of the rubber granulate or of the rubber shavings is possible without difficulty in the course of the absorption of organic hydrocarbons. It is, however, also possible to impart a profile to the entire surface of the molded body and/or the arrangement of inner spaces therein.

The trough or the like comprises, in accordance with a further embodiment of the invention, an oil or solvent resistant elastomer, for example, NBR-elastomer, CR-elastomer, ECO-elastomer, FKM-elastomer and/or the trough contains at least a barrier layer of oil and/or solvent resistant material such as a foil of polyimide, polypropylene or polyethylene. Finally, it is however also possible that the trough is comprised of a metal or an oil and/or solvent resistant plastic such as plastomer or duromer.

When an absorption mat according to the invention is saturated with aromatic hydrocarbons, the possibility of a thermal regeneration, for example, by means of water vapor, hot air or vacuum vapor is given as known per se. However, even a combustion in the combustion equipment suitable therefor can take place. Furthermore, it is possible to remove the hydrocarbons by pressing so that a limited further use of the absorption mat according to the invention is provided. These hydrocarbons are not stuck in the rubber material and are located in the hollow spaces of the molded body because of capillary action.

The granulate or the shavings of the plate-like or block-like molded body can be bonded by binding agents or glue resistant to the organic hydrocarbons, by latex processes and/or by vulcanization. The trough or the like can be fixedly bonded to the plate-like or block-like molded body by vulcanization. However, it is also possible to fix the plate-like or block-like molded body in the trough by cementing.

It is understood that the invention includes an arrangement wherein the trough is defined by a structural base or structural base region provided with a barrier layer on which the material receiving or absorbing the organic hydrocarbons can be placed as a runner product or mat product.

On the other hand, it also conceivable according to the invention, to provide a trough or an enclosure with the insert made of a material receiving or absorbing organic hydrocarbons so that the engine-area, transmission-area, drive-area of a motor vehicle and especially a farm tractor is covered from below and/or enclosed to thereby prevent oils, fats and fuels of the particular vehicle from reaching the ground. In the case of an enclosure which exhibits these features, for the motor-area, transmission-area, drive-area of a motor vehicle, a noise absorption or noise attenuation is obtained as an additional effect.

BRIEF DESCRIPTION OF THE DRAWINGS

FIG. 1 is a perspective partial view in natural size of a first embodiment of an absorption mat; whereas.

DESCRIPTION OF THE PREFERRED EMBODIMENTS OF THE INVENTION

Figure 1:
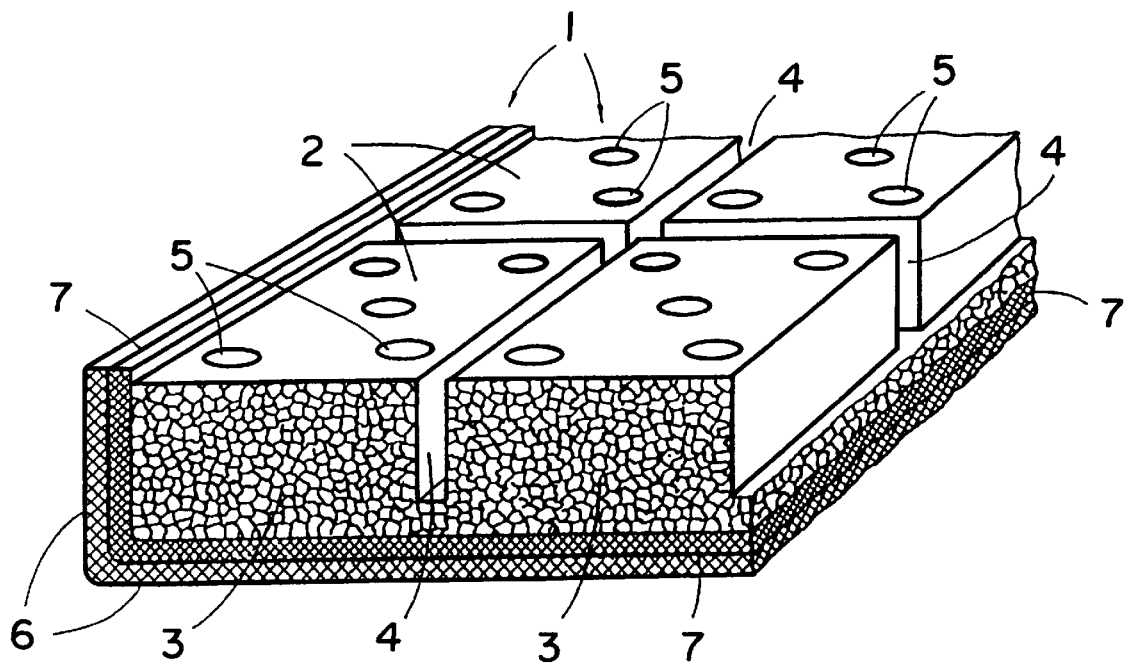

The absorption mat 1 shown in the drawing of FIG. 1 is intended to be used especially for trapping liquid, paste-like or solid aromatic hydrocarbons. The absorption mat includes a plate-like and/or block-like molded body 2 which is made of rubber granulate 3 or rubber shavings 3. The rubber granulate or rubber shavings are brought into a bond which holds its shape. The following materials are suitable, for example, NR-elastomers, IR-elastomers, IIR-elastomers, BR-elastomers, SBR-elastomers, thermoplastic elastomers (TPE), thermoplasts or even duroplasts.

The granulate 3 or the shavings 3 can be a solid material as well as a porous material such as cellular rubber, microcellular rubber or foam rubber. The rigid bond between the individual granulate bodies or granulate shavings is obtained by adding oil resistant and/or solvent resistant binding agents and/or by vulcanization. A latex processing of the rubber granulate or the rubber shavings in advance of pressing the same and in advance of vulcanization is also conceivable.

The granulate and/or shavings 3 are held in the plate-like and/or block-like molded body 2 and can inherently swell after receiving the hydrocarbons. For this reason, it is important that the plate-like and/or block-like molded body 2 is provided with recesses at least over the greater part of its thickness. These recesses can, for example, be slots or rills 4 or holes 5. It is, however, also possible to provide a combination of such recesses and holes. Thus, the plate-like and block-like molded body 2 can be provided with slots or rills 4 as well as with holes 5 as shown in FIG. 1.

Another important feature of the configuration of the absorption mat 1 comprises that the plate-like and/or block-like molded body 2 is accommodated in a trough 6 or the like which is open at one end at the top. This trough 6 or the like is manufactured as a whole from an oil resistant and/or solvent resistant elastomer, for example, NBR-elastomer, CR-elastomer, ECO-elastomer, FKM-elastomer. It is, however, also possible to provide the trough 6 or the like only with an oil impermeable and/or solvent impermeable barrier layer 7 which can, for example, be formed from an embedded polyimide, polypropylene or polyethylene foil. As an alternative, the trough 6 can, however, also be made of metal or a plastic resistant to oil and/or resistant to solvent. The plastic can be plastomer or duromer.

Even though it is conceivable to introduce the plate-like and/or block-like molded body 2 simply loosely or with a press fit in the trough 6, it should be more advantageous to provide a fixed connection of the trough 6 or the like to the plate-like and/or block-like molded body 2.

The trough 6 or the like is premanufactured independently of the plate-like or block-like molded bodies 2. The trough 6 or the like can be joined fixedly to the molded body in the simplest manner by vulcanization or cementing.

The plate-like and/or block-like molded bodies 2 are preferably received with its entire thickness in the trough 6 or the like. The molded bodies 2 can take up a relatively large quantity of liquid hydrocarbons with their rubber granulates or rubber shavings 3 before they have reached their saturation condition. Then, a thermal regeneration as known per se is possible such as by means of water vapor, hot air or vacuum vapor. However, a combustion in a combustion facility suitable therefor can also take place if the trough 6 is not made of metal.

Furthermore, it is possible to press the hydrocarbons out of the molded body 2 so that a limited further use of the absorption mat 1 can be had. These hydrocarbons are disposed in the hollow spaces of the molded body 2 because of capillary action.

Figure 2:
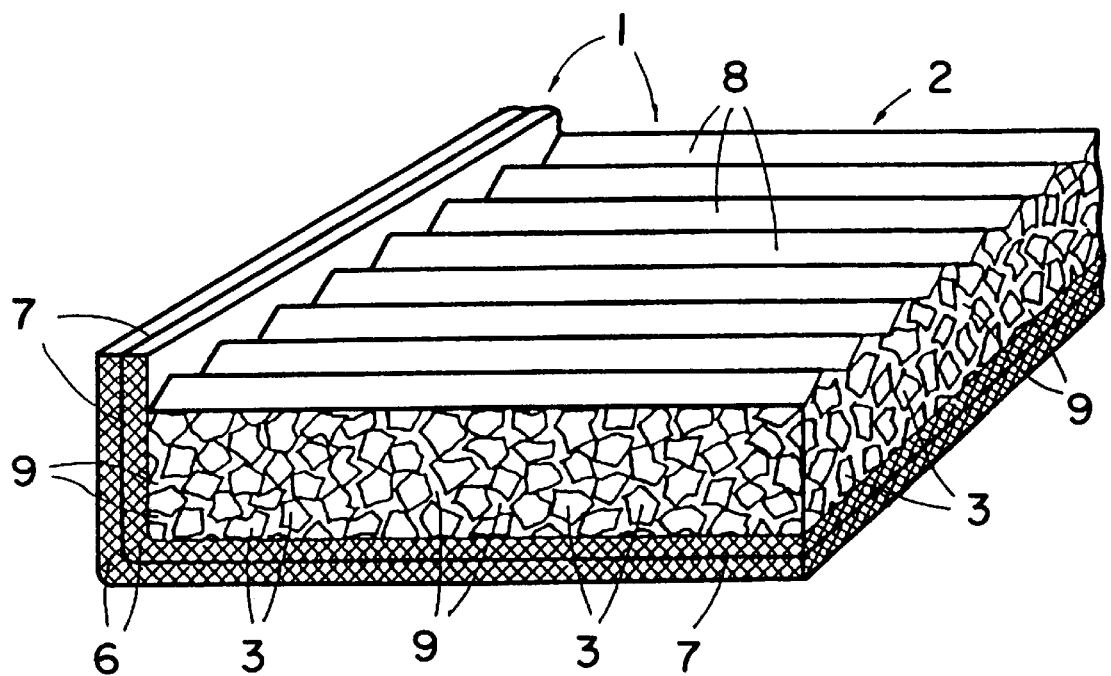
FIG. 2 is a second structural form of such an absorption mat.

In FIG. 2 of the drawing, a modified embodiment of an absorption mat 1 is shown. This embodiment distinguishes from that shown in FIG. 1 of the drawing in that it includes a relatively coarse structure on its entire surface, for example, in the form of a profile 8. The profile 8 can, for example, comprise corrugations, waffle patterns, knurlings or even protuberances.

Furthermore, it has been shown to provide hollow spaces 9 in the interior of the plate-like and/or block-like molded body 2. These hollow spaces 9 can also be provided independently of the surface structuring. The hollow spaces 9 between the granulate 3 or the shavings 3 and the grain size of the granulate 3 or the shavings 3 can be so dimensioned in an advantageous manner that the swelling of the granulate parts or shaving parts does not lead to a significant outer deformation of the molded body 2.

The embodiments of an absorption mat explained with respect to FIGS. 1 and 2 can be advantageously used in such a manner that they always enclose the engine-area, transmission-area, drive-area of a motor vehicle and especially of a farm tractor in the manner of a pan or even in the manner of an enclosure. In this manner, fats, oils or fuels from the engine, from the transmission or from the drive can be prevented from reaching the ground over which the motor vehicle is driven.

On the other hand, it is also conceivable to provide an arrangement wherein the trough is defined by a structure base or structure base region provided with a barrier layer supplement on which the material absorbing or receiving the organic hydrocarbons can be placed as a runner product or mat product.

What is claimed is:

1. An absorption mat for hydrocarbons in liquid, paste or solid form including oils, fats, fuels and solvents, the absorption mat comprising:

a flat molded body having a plate or block configuration;

said body having an uncovered top surface completely exposed to receive said hydrocarbons thereon;

said body being defined by granulate or shavings made of elastomer for absorbing and trapping said hydrocarbons therein;

binding means for joining said granulate or shavings in a form-maintaining rigid bond with each other and to define a multiplicity of hollow spaces in said body communicating with each other and said top surface thereby facilitating the dispersal of said hydrocarbons within said body for absorption thereby;

said binding means being resistant to hydrocarbons thereby causing said body to retain its overall shape in the presence of said hydrocarbons; and, said flat molded body having additional spaces formed therein to accommodate swelling of said flat molded body as the hydrocarbons become trapped therein.

2. The absorption mat of claim 1, said elastomer being selected from the group consisting of:

natural rubber elastomer, isoprene rubber elastomer, isobutylene isoprene copolymer elastomer, butadiene rubber elastomer and thermoplastic elastomer.

3. The absorption mat of claim 1, wherein said molded body is made of a material processed to be porous or cellular.

4. The absorption mat of claim 1, wherein said granulate or said shavings of said molded body are porous and are made of a material selected from the group consisting of cellular rubber, microcellular rubber and foam rubber.

5. The absorption mat of claim 1, wherein said binding means is selected from the group consisting of a binding agent, a latex process and vulcanization.

6. The absorption mat of claim 1, said additional spaces being a plurality of cutouts formed therein thereby providing space to accommodate swelling of said molded body as said hydrocarbons become trapped therein.

7. The absorption mat of claim 6, said cutouts including at least one of slots, rills, holes and inner hollow spaces.

8. The absorption mat of claim 6, wherein: said molded body has a thickness measured from said top surface; and, said cutouts are formed therein so as to extend from said top surface to at least over half of said thickness.

9. The absorption mat of claim 1, wherein said hollow spaces between said granulate or said shavings and the grain size of said granulate or said shavings are so dimensioned that outer deformations of said molded body are avoided when said granulate or said shavings swell in the presence of said hydrocarbons.

10. The absorption mat of claim 1, further comprising:

a trough having a base and a side wall extending upwardly from said base to define an upwardly directed opening;

said trough including barrier means for defining a barrier resistant to said hydrocarbons; and, said molded body being seated in said trough.

11. The absorption mat of claim 10, wherein said trough is made of an elastomer substantially resistant to said hydrocarbons, said elastomer being selected from the group consisting of butadiene acrylonitride copolymer elastomer, chloroprene rubber elastomer, epichlorohydrin-ethylene oxide copolymer elastomer and fluoro rubber elastomer; and, said barrier means is a layer made of a material resistant to said hydrocarbons and said material is selected from the group consisting of polyimide, polyethylene and polypropylene.

12. The absorption mat of claim 10, wherein said trough is vulcanized to said molded body.

13. The absorption mat of claim 10, wherein said trough is fixedly cemented to said molded body.

14. The absorption mat of claim 10, wherein said barrier means is a barrier layer disposed on said base and said side wall and said molded body is placed in said trough on said barrier layer.

15. The absorption mat of claim 1, said molded body having a bottom surface; the absorption mat further comprising a base layer contiguous to said bottom surface and made of material resistant to hydrocarbons; and, said molded body and said base layer conjointly defining a layered configuration.

16. The absorption mat of claim 1, wherein said additional spaces are a plurality of slots in said body.

* * * * *